(12) United States Patent
Sakurai et al.

(10) Patent No.: US 12,068,507 B2
(45) Date of Patent: Aug. 20, 2024

(54) TERMINAL COMPONENT AND SECONDARY BATTERY AND ASSEMBLED BATTERY EACH INCLUDING THE TERMINAL COMPONENT

(71) Applicant: PRIME PLANET ENERGY & SOLUTIONS, INC., Tokyo (JP)

(72) Inventors: Takahiro Sakurai, Nagoya (JP); Kosuke Suzuki, Toyota (JP); Kota Ohata, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/876,054

(22) Filed: Jul. 28, 2022

(65) Prior Publication Data

US 2023/0039284 A1 Feb. 9, 2023

(30) Foreign Application Priority Data

Aug. 6, 2021 (JP) .................................. 2021-130091

(51) Int. Cl.
*H01M 50/557* (2021.01)
*H01M 50/209* (2021.01)
(Continued)

(52) U.S. Cl.
CPC ....... *H01M 50/557* (2021.01); *H01M 50/209* (2021.01); *H01M 50/516* (2021.01); *H01M 50/562* (2021.01)

(58) Field of Classification Search
CPC ............. H01M 50/209; H01M 50/516; H01M 2220/20; H01M 10/0525; H01M 50/503;
(Continued)

(56) References Cited

U.S. PATENT DOCUMENTS

2003/0170535 A1 9/2003 Watanabe et al.
2005/0100785 A1 5/2005 Enomoto et al.
(Continued)

FOREIGN PATENT DOCUMENTS

CN 102544423 A 7/2012
CN 103227311 A 7/2013
(Continued)

OTHER PUBLICATIONS

Philipp A. Schmidt, Markus Schweier, and Micheal F. Zaeh , "Joining of lithium-ion batteries using laser beam welding: Electrical losses of welded aluminum and copper joints", ICALEO 2012, 915-923 (2012) Obtained from: https://doi.org/10.2351/1.5062563 on Feb. 10, 2023. Published online on Sep. 27, 2018. (Year: 2018).*

(Continued)

*Primary Examiner* — Michael L Dignan
(74) *Attorney, Agent, or Firm* — Finnegan, Henderson, Farabow, Garrett, and Dunner, LLP (57) ABSTRACT

This disclosure provides a terminal component that can reduce thermal deterioration due to beam irradiation to a metal joining portion. A terminal component disclosed herein includes a first member formed of a metal and a plate-like second member formed of a metal, and a metal joining portion joined by metal joining is formed in a boundary surface where the first member and the second member are stacked. On a surface of the second member in an opposite side to the boundary surface, a raised portion raised from the surface is formed in a peripheral portion close to the metal joining portion.

7 Claims, 8 Drawing Sheets

(51) Int. Cl.
*H01M 50/516* (2021.01)
*H01M 50/562* (2021.01)

(58) Field of Classification Search
CPC ...... H01M 50/522; H01M 50/543–567; Y02E 60/10; B23K 20/10–106
See application file for complete search history.

(56) References Cited

U.S. PATENT DOCUMENTS

| | | |
|---|---|---|
| 2011/0052970 A1 | 3/2011 | Kurata et al. |
| 2012/0148908 A1 | 6/2012 | Ito |
| 2012/0214030 A1 | 8/2012 | Guen |
| 2013/0196192 A1* | 8/2013 | Harada ............... H01M 50/578 429/61 |
| 2013/0224536 A1 | 8/2013 | Hattori et al. |
| 2014/0178746 A1 | 6/2014 | Ono |
| 2015/0086844 A1 | 3/2015 | Masuda |
| 2015/0136839 A1 | 5/2015 | Kanryo et al. |
| 2015/0140391 A1 | 5/2015 | Sakate et al. |
| 2015/0183052 A1 | 7/2015 | Murakami et al. |
| 2015/0221926 A1 | 8/2015 | Yoshitake et al. |
| 2015/0243955 A1 | 8/2015 | Kang |
| 2015/0295221 A1* | 10/2015 | Urano ............... H01M 50/176 429/61 |
| 2015/0318519 A1* | 11/2015 | Tsutsumi ............ B23K 20/002 429/163 |
| 2015/0380712 A1 | 12/2015 | Tsunaki et al. |
| 2016/0043353 A1 | 2/2016 | Tsutsumi et al. |
| 2016/0118641 A1 | 4/2016 | Oda et al. |
| 2016/0254517 A1 | 9/2016 | Tsunaki et al. |
| 2016/0372722 A1 | 12/2016 | Yoshida et al. |
| 2017/0054131 A1 | 2/2017 | Yokota et al. |
| 2017/0229700 A1 | 8/2017 | Matsumoto et al. |
| 2018/0085847 A1* | 3/2018 | Sato ..................... B23K 20/10 |
| 2018/0207745 A1 | 7/2018 | Hori et al. |
| 2018/0294465 A1 | 10/2018 | Nagai et al. |
| 2018/0331348 A1 | 11/2018 | Kobayashi |
| 2019/0044107 A1 | 2/2019 | Ito |
| 2019/0054562 A1* | 2/2019 | Miyashiro ......... B29C 66/81435 |
| 2019/0221791 A1 | 7/2019 | Wakimoto |
| 2019/0273240 A1 | 9/2019 | Hagino et al. |
| 2020/0075923 A1 | 3/2020 | Takabayashi et al. |
| 2020/0091492 A1 | 3/2020 | Guen |
| 2020/0243868 A1 | 7/2020 | Takabayashi et al. |
| 2020/0358071 A1 | 11/2020 | Kawanishi |
| 2022/0085463 A1 | 3/2022 | Suzuki et al. |
| 2022/0085467 A1 | 3/2022 | Suzuki et al. |
| 2022/0085468 A1 | 3/2022 | Suzuki et al. |
| 2022/0085469 A1 | 3/2022 | Suzuki et al. |
| 2023/0015845 A1 | 1/2023 | Sakurai |

FOREIGN PATENT DOCUMENTS

| | | |
|---|---|---|
| CN | 105830253 A | 8/2016 |
| CN | 106575741 A | 4/2017 |
| CN | 107848064 A | 3/2018 |
| CN | 110048065 A | 7/2019 |
| CN | 209880722 U | 12/2019 |
| CN | 110875462 A | 3/2020 |
| CN | 111183536 A | 5/2020 |
| EP | 2490282 A1 | 8/2012 |
| EP | 3 062 370 A1 | 8/2016 |
| EP | 3179537 A1 | 6/2017 |
| EP | 3 467 906 A1 | 4/2019 |
| EP | 3 972 042 A1 | 3/2022 |
| JP | H 07-224944 A | 8/1995 |
| JP | H 09-219204 A | 8/1997 |
| JP | H 11-283588 A | 10/1999 |
| JP | 2001-126706 A | 5/2001 |
| JP | 2001-357834 A | 12/2001 |
| JP | 2004-220963 A | 8/2004 |
| JP | 2005-019213 A | 1/2005 |
| JP | 2009-087728 A | 4/2009 |
| JP | 2009-110808 A | 5/2009 |
| JP | 2011-124024 A | 6/2011 |
| JP | 2012-174452 A | 9/2012 |
| JP | 2013-075297 A | 4/2013 |
| JP | 2013-93287 A | 5/2013 |
| JP | 2013-157156 A | 8/2013 |
| JP | 2014-127277 A | 7/2014 |
| JP | 2014-146498 A | 8/2014 |
| JP | 2014-526962 A | 10/2014 |
| JP | 2015-011785 | 1/2015 |
| JP | 2015-030007 * | 2/2015 ............ B23K 20/12 |
| JP | 2015-030007 A | 2/2015 |
| JP | 2015-056273 A | 3/2015 |
| JP | 2015-059826 A | 3/2015 |
| JP | 2015-060730 A | 3/2015 |
| JP | 2015-088464 A | 5/2015 |
| JP | 2015-099759 | 5/2015 |
| JP | 2015-153521 A | 8/2015 |
| JP | 2015-162460 A | 9/2015 |
| JP | 2016-018675 A | 2/2016 |
| JP | 2016-058215 A | 4/2016 |
| JP | 2016-085961 A | 5/2016 |
| JP | 2016-129125 | 7/2016 |
| JP | 2016-132131 A | 7/2016 |
| JP | 2016-192285 A | 11/2016 |
| JP | 2016-207510 A | 12/2016 |
| JP | 2017-027819 A | 2/2017 |
| JP | 6087413 B1 | 3/2017 |
| JP | 6216368 B2 | 10/2017 |
| JP | 2017-228418 A | 12/2017 |
| JP | 2018-181552 | 11/2018 |
| JP | 2019-009045 A | 1/2019 |
| JP | 2020-102320 A | 7/2020 |
| JP | 2020-107473 A | 7/2020 |
| JP | 2020-119874 A | 8/2020 |
| KR | 2016-0107938 A | 9/2016 |
| KR | 2019-0124039 A | 11/2019 |
| WO | WO 2013/013083 A2 | 1/2013 |
| WO | WO 2014/042005 A1 | 3/2014 |
| WO | WO 2015/060175 A1 | 4/2015 |
| WO | WO 2016/020996 A1 | 2/2016 |
| WO | WO 2014/103874 A1 | 1/2017 |
| WO | WO 2017/141694 A1 | 8/2017 |

OTHER PUBLICATIONS

Z. Zhang et al. "Effects of ultrasonic assisted friction stir welding on flow behavior, microstructure and mechanical properties of 7N01-T4 aluminum alloy joints." Journal of Materials Science & Technology 43 (2020) 1-13 (Year: 2020).*
JP 2015-030007 machine English translation (Year: 2015).*
Dhara et al., "Impact of ultrasonic welding on multi-layered Al-Cu joint for electric vehicle battery applications: A layer-wise microstructural analysis," Materials Science & Engineering A, 791, 139795, Jun. 21, 2010, pp. 1-18.
Non-Final Office Action dated Aug. 30, 2022, issued in U.S. Appl. No. 17/409,990.
Non-Final Office Action dated Dec. 29, 2022, issued in U.S. Appl. No. 17/404,355.
Non-Final Office Action dated Feb. 1, 2023, issued in U.S. Appl. No. 17/404,616.
Non-Final Office Action dated Feb. 22, 2023, issued in U.S. Appl. No. 17/404,454.
Notice of Allowance dated Mar. 8, 2023, issued in U.S. Appl. No. 17/409,990.
Final Office Action dated Apr. 4, 2023, issued in U.S. Appl. No. 17/404,355.
Non Final Office Action dated Aug. 15, 2023, issued in U.S. Appl. No. 17/404,355.
Final Office Action dated Jun. 15, 2023, issued in U.S. Appl. No. 17/404,616.
Final Office Action dated Aug. 31, 2023, in U.S. Appl. No. 17/404,454.
Office Action dated Oct. 13, 2023, in U.S. Appl. No. 17/404,616.
Final Office Action issued in U.S. Appl. No. 17/404,355 dated Jan. 31, 2024.
Final Office Action issued in U.S. Appl. No. 17/404,616 dated Feb. 16, 2024.

(56) References Cited

OTHER PUBLICATIONS

Office Action issued in U.S. Appl. No. 17/404,454 dated Mar. 13, 2024.
"Mechanical Manufacturing Inspection Technique, Thermal Processing Section," pp. 487-488, Mar. 1988.
Office Action in CN 202111086085.6, dated Mar. 20, 2024.
Notice of Allowance and Notice of Allowability in U.S. Appl. No. 17/404,616, dated May 22, 2024.

* cited by examiner

TERMINAL COMPONENT AND SECONDARY BATTERY AND ASSEMBLED BATTERY EACH INCLUDING THE TERMINAL COMPONENT

CROSS REFERENCE TO RELATED APPLICATIONS

The present application claims priority from Japanese Patent Application No. 2021-130091 filed on Aug. 6, 2021, which is incorporated by reference herein in its entirety.

BACKGROUND

The present disclosure relates to a terminal component and a secondary battery and an assembled battery each including the terminal component.

Since secondary batteries, such as lithium-ion secondary batteries or the like, are lightweight and can provide a high energy density, the secondary batteries have been preferably used as high-output drive power sources for vehicles, such as battery electronic vehicle, hybrid electronic vehicle, or the like, and further increase in demand for secondary batteries in future is expected. For high-output drive power sources, in order to improve output, assembled batteries which include a plurality of secondary batteries (battery cells) electrically connected mutually are preferably used. In general, in such an assembled battery, for adjacent battery cells, an electrode terminal of one of the battery cells and an electrode terminal of the other battery cells are connected to each other via a bus bar.

Japanese Laid-open Patent Publication No. 2015-99759 discloses a structure of a connection bus bar used for an assembled battery. The connection bus bar includes a protrusion that protrudes toward an electrode terminal. In the protrusion, the electrode terminal and the connection bus bar are welded, and thus, generation of a gap between the connection bus bar and the electrode terminal due to a variation in a height of the electrode terminal and an error in a shape of the connection bus bar can be suppressed.

Japanese Laid-open Patent Publication No. 2018-181552 discloses a structure of a welding portion between a bus bar and an external terminal in an assembled battery. The bus bar used in Japanese Laid-open Patent Publication No. 2018-181552 is a plate-like member and includes two terminal connection portions stacked on the external terminal and a connection portion that connects the two terminal connection portions. A linear welding portion is formed in a portion in which the terminal connection portions and the external terminal are stacked. The welding portion has a non-ring shape and includes a straight line portion extending in an orthogonal direction to an array direction of a plurality of battery cells forming the assembled battery and two circular arc portions each extending from a corresponding one of both ends of the straight line portion and being curved toward an opposite side to a side in which the connection portion is located. Thus, damage in respective portions of the bus bar and the external terminal that are welded together can be suppressed.

SUMMARY

Incidentally, beam welding, such as laser welding or the like, is widely used for welding a bus bar and an electrode terminal. In beam welding, after a bus bar is locally melted in a portion irradiated with a beam, a melted portion is solidified, thereby realizing welding with an electrode terminal. However, when a metal joining portion existing near a portion that has been welded or the like is irradiated with a beam, the metal joining portion is thermally deteriorated, so that reduction in joining strength or reduction in conductivity can be caused.

In view of the foregoing, the present disclosure has been devised and it is therefore a major object of the present disclosure to provide a terminal component that can reduce thermal deterioration due to beam irradiation to a metal joining portion.

In order to realize the object, a terminal component disclosed herein includes a first member formed of a metal, and a plate-like second member formed of a metal, and a metal joining portion joined by metal joining is formed in a boundary surface where the first member and the second member are stacked. On a surface of the second member in an opposite side to the boundary surface, a raised portion raised from the surface is formed in a peripheral portion close to the metal joining portion.

According to a structure described above, the raised portion raised from the surface of the second member is formed in the peripheral portion close to the metal joining portion. The raised portion can function as a wall that shields a portion near the metal joining portion from irradiation of a beam. Thus, heat input to the metal joining portion by beam irradiation is suppressed, so that thermal deterioration of the metal joining portion can be reduced.

In one embodiment of the terminal component disclosed herein, the surface of the second member in the opposite side to the boundary surface includes a recessed portion and the raised portion is formed in the recessed portion. In one embodiment of the terminal component disclosed, a maximum height from a bottom portion of the recessed portion of the raised portion does not exceed a height from the bottom portion of the recessed portion to the surface including the recessed portion. According to a structure described above, the raised portion is formed so as to remain inside the recessed portion, and therefore, an external member (for example, a bus bar) and the surface of the second member in which the recessed portion is formed can be preferably welded to each other in a state where the external member and the surface of the second member are stacked. Moreover, the raised portion in the recessed portion can reduce heat input to the metal joining portion by beam irradiation.

In another embodiment of the terminal component disclosed herein, the raised portion is continuously formed so as to surround the metal joining portion. According to a structure described above, the raised portion is formed all around the metal joining portion, and therefore, heat input to the metal joining portion by beam irradiation from various directions can be preferably suppressed.

In still another embodiment of the terminal component disclosed herein, the raised portion includes a flat upper surface. Thus, heat input to the metal joining portion by beam irradiation can be more preferably reduced.

In the terminal component disclosed herein, the metal joining portion may be an ultrasonic joining portion joined by ultrasonic joining.

The present disclosure provides a secondary battery including the terminal component disclosed herein. A secondary battery disclosed herein includes an electrode body including a positive electrode and a negative electrode, a battery case housing the electrode body therein, a positive electrode terminal electrically connected to the positive electrode, and a negative electrode terminal electrically connected to the negative electrode. At least one of the positive electrode terminal and the negative electrode terminal includes the terminal component disclosed herein. Thus, in beam-welding an external member to the terminal component of the secondary battery, heat input to the metal joining portion of the terminal component by beam irradiation can be reduced, so that thermal deterioration of the metal joining portion can be reduced.

The present disclosure provides an assembled battery including the secondary battery disclosed herein. An assembled battery disclosed herein is an assemble battery including a plurality of battery cells electrically connected mutually and thus arrayed and includes the secondary battery disclosed herein as at least one of the battery cells. Furthermore, in one embodiment, for the plurality of battery cells, the positive electrode of one of the plurality of battery cells and the negative electrode of another one of the plurality of battery cells are electrically connected to each other via a bus bar, the terminal component includes a welding portion in which the second member and the bus bar electrically connected to the second member are beam welded, and the raised portion is located between the metal joining portion and the welding portion. Thus, the assembled battery in which thermal deterioration of the metal joining portion has been reduced can be realized.

DETAILED DESCRIPTION

A technology disclosed herein will be described in detail below. Matters other than matters specifically mentioned in this specification and necessary for carrying out the present disclosure can be understood as design matters for those skilled in the art based on the related art in the related field. Contents of a technology disclosed herein can be carried out based on contents disclosed in this specification and the common general technical knowledge in the field.

The accompanying drawings are schematic and dimension relations (length, width, thickness, or the like) in the drawings do not necessarily reflect actual dimensional relations. In the following drawings, members/portions that have the same effect may be denoted by the same sign and the overlapping description may be omitted or simplified.

In this specification, the notation "A to B" (herein each of A and B is an arbitrary numerical value) that indicates a numerical range means "A or more and B or less" (including a range that exceeds A and is lower than B), similar to a general interpretation.

As used herein, a term "secondary battery" refers to overall storage devices in which charge carriers move between a pair of electrodes (a positive electrode and a negative electrode) via an electrolyte and thus a charging and discharging reaction occurs. Such secondary batteries include not only so-called storage batteries, such as a lithium-ion secondary battery, a nickel hydrogen battery, a nickel cadmium battery, or the like, but also capacitors, such as an electric double-layered capacitor or the like. As the secondary battery, a lithium-ion secondary battery will be described as an example.

<Lithium-Ion Secondary Battery 10>

Figure 1:
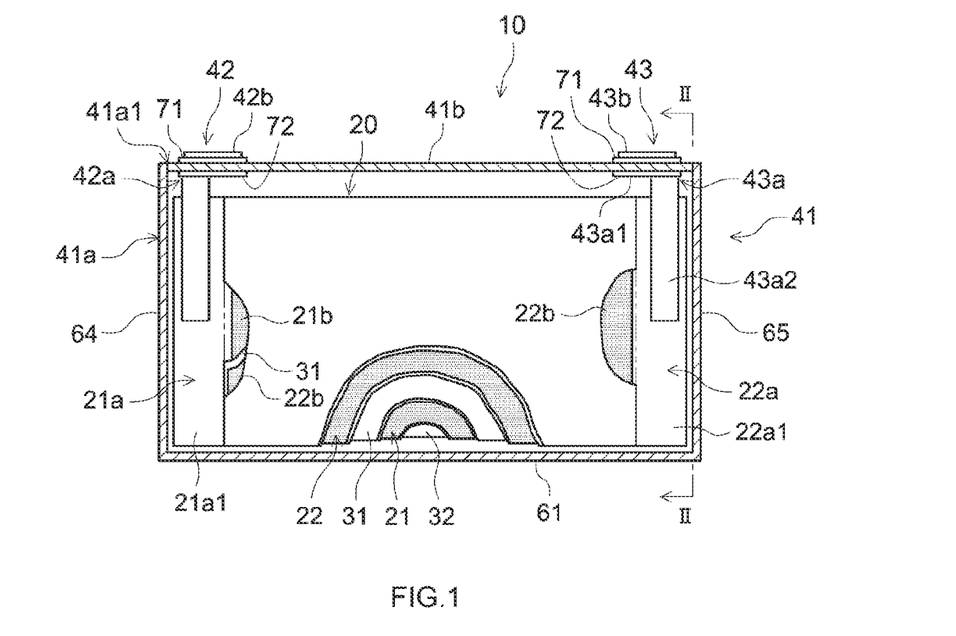
FIG. 1 is a partial cross-sectional view schematically illustrating a structure of a lithium-ion battery according to one embodiment.
Figure 2:
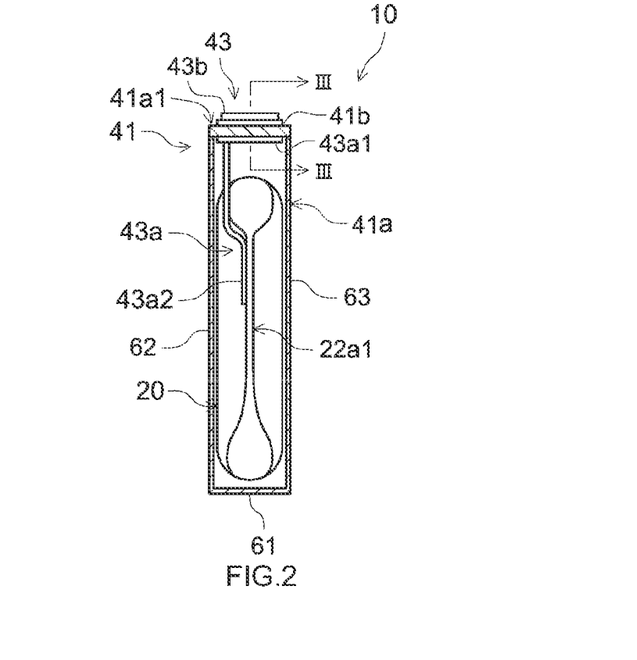
FIG. 2 is a cross-sectional view illustrating a cross section taken along the line II-II of FIG. 1.

FIG. 1 is a partial cross-sectional view schematically illustrating a structure of a lithium-ion secondary battery 10. In FIG. 1, a state where an inside of the lithium-ion secondary battery 10 is exposed along a broad width surface on one side of a battery case 41 having an approximately rectangular parallelepiped shape is illustrated. The lithium-ion secondary battery 10 illustrated in FIG. 1 is a so-called sealed battery. FIG. 2 is a cross-sectional view illustrating a cross section taken along the line II-II of FIG. 1. In FIG. 2, a partial cross-sectional view in a state where the inside of the lithium-ion secondary battery 10 is exposed along a narrow width surface on one side of the battery case 41 having an approximately rectangular parallelepiped shape is schematically illustrated.

As illustrated in FIG. 1, the lithium-ion secondary battery 10 includes an electrode body 20, the battery case 41, a positive electrode terminal 42, and a negative electrode terminal 43.

<Electrode Body 20>

The electrode body 20 is housed in the battery case 41 in a state where the electrode body 20 is covered by an insulation film (not illustrated) or the like. The electrode body 20 includes a positive electrode sheet 21 as a positive element, a negative electrode sheet 22 as a negative electrode element, and separator sheets 31 and 32 as separators. Each of the positive electrode sheet 21, the first separator sheet 31, the negative electrode sheet 22, and the second separator sheet 32 is a long band-like member.

The positive electrode sheet 21 is configured such that a positive electrode active material layer 21*b* containing a positive electrode active material is formed on each of both surfaces on a positive electrode current collecting foil 21*a* (for example, an aluminum foil) having preset width and thickness excluding an unformed portion 21*a*1 set to have a uniform width in an end portion on one side in a width direction. For example, in a lithium-ion secondary battery, the positive electrode active material is a material, such as a lithium transition metal compound material, that emits lithium ions during charging and absorbs lithium ions during discharging. In general, various other materials than the lithium transition metal compound material have been proposed for positive electrode active materials, and there is no particular limitation on the positive electrode active material used herein.

The negative electrode sheet 22 is configured such that a negative electrode active material layer 22b containing a negative electrode active material is formed on each of both surfaces on a negative electrode current collecting foil 22a (a copper foil herein) having preset width and thickness excluding an unformed portion 22a1 set to have a uniform width in an end portion on one side in the width direction. For example, in a lithium-ion secondary battery, the negative electrode active material is a material, such as natural graphite, that absorbs lithium ions during charging and discharges lithium ions that have been absorbed during charging during discharging. In general, various other materials than the natural graphite have been proposed for negative electrode active materials, and there is no particular limitation on the negative electrode active material used herein.

For each of the separator sheets 31 and 32, for example, a porous resin sheet which has a required heat resistance and through which an electrolyte can pass is used. Various proposals have been made for the separator sheets 31 and 32, and there is no particular limitation on the separator sheets 31 and 32.

Herein, the negative electrode active material layer 22b is formed, for example, to have a width larger than that of the positive electrode active material layer 21b. Each of the separator sheets 31 and 32 has a width larger than that of the negative electrode active material layer 22b. The unformed portion 21a1 of the positive electrode current collecting foil 21a and the unformed portion 22a1 of the negative electrode current collecting foil 22a are disposed to face opposite directions away from each other in the width direction. The positive electrode sheet 21, the first separator sheet 31, the negative electrode sheet 22, and the second separator sheet 32 are stacked in this order and are wound such that directions thereof are aligned in a long-side direction. The negative electrode active material layer 22b covers the positive electrode active material layer 21b with the separator sheets 31 and 32 interposed between the negative electrode active material layer 22b and the positive electrode active material layer 21b. The negative electrode active material layer 22b is covered by the separator sheets 31 and 32. The unformed portion 21a1 of the positive electrode current collecting foil 21a protrudes from one side of the separator sheets 31 and 32 in the width direction. The unformed portion 21a1 of the negative electrode current collecting foil 22a protrudes from the separator sheets 31 and 32 in an opposite side in the width direction.

As illustrate in FIG. 1, the electrode body 20 described above is formed to be flat along a single plane including a winding axis to be housed in a case body 41a of the battery case 41. In an end portion of the winding axis of the electrode body 20, the unformed portion 21a1 of the positive electrode current collecting foil 21a is disposed on one side and the unformed portion 22a1 of the negative electrode current collecting foil 22a is disposed in an opposite side.

<Battery Case 41>

As illustrated in FIG. 1, the battery case 41 houses the electrode body 20 therein. The battery case 41 includes the case body 41a having an approximately rectangular parallelepiped shape with an opening on one side surface and a lid 41b attached to the opening. In this embodiment, from a view point of reducing a weight and ensuring a required rigidity, each of the case body 41a and the lid 41b is formed of aluminum or an aluminum alloy mainly containing aluminum.

<Case Body 41a>

As illustrated in FIG. 1 and FIG. 2, the case body 41a has an approximately rectangular parallelepiped shape with an opening on one side surface. The case body 41a has an approximately rectangular bottom surface portion 61, a pair of broad width surface portions 62 and 63, and a pair of narrow width surface portions 64 and 65. Each of the pair of broad width surface portions 62 and 63 rises from a corresponding longer side of the bottom surface portion 61. Each of the pair of narrow width surface portions 64 and 65 rises from a corresponding shorter side of the bottom surface portion 61. An opening 41a1 surrounded by the pair of broad width surface portions 62 and 63 and the pair of narrow width surface portions 64 and 65 is formed in one side surface of the case body 41a.

<Lid 41b>

The lid 41b is attached to the opening 41a1 of the case body 41a surrounded by longer sides of the pair of broad width surface portions 62 and 63 and shorter sides of the pair of narrow width surface portions 64 and 65. A peripheral portion of the lid 41b is joined to an edge of the opening 41a1 of the case body 41a. The above-described joining may be achieved, for example, by continuous welding without any gap. Such welding can be realized, for example, by laser welding.

In this embodiment, the positive electrode terminal 42 and the negative electrode terminal 43 are mounted on the lid 41b. The positive electrode terminal 42 includes an internal terminal 42a and an external terminal 42b. The negative electrode terminal 43 includes an internal terminal 43a and an external terminal 43b. Each of the internal terminals 42a and 43a is mounted on an inside of the lid 41b via an insulator 72. Each of the external terminals 42b and 43b is mounted on an outside of the lid 41b via a gasket 71. Each of the internal terminals 42a and 43a extends inside the case body 41a. The internal terminal 42a of the positive electrode is connected to the unformed portion 21a1 of the positive electrode current collecting foil 21a. The internal terminal 43a of the negative electrode is connected to the unformed portion 22a1 of the negative electrode current collecting foil 22a.

The unformed portion 21a1 of the positive electrode current collecting foil 21a and the unformed portion 22a1 of the negative electrode current collecting foil 22a in the electrode body 20 are mounted on the internal terminals 42a and 43a each being mounted on a corresponding one of both side portions of the lid 41b in a longitudinal direction, respectively, as illustrated in FIG. 1. The electrode body 20 is housed in the battery case 41 so as to be mounted on the internal terminals 42a and 43a each being mounted on the lid 41b. Note that, herein, a wound type electrode body 20 is illustrated as an example. A structure of the electrode body 20 is not limited to the above-described structure. The structure of the electrode body 20 may be, for example, a stacked structure in which a positive electrode sheet and a negative electrode sheet are alternately stacked via a separator sheet therebetween. Plural electrode bodies 20 may be housed in the battery case 41.

Figure 3:
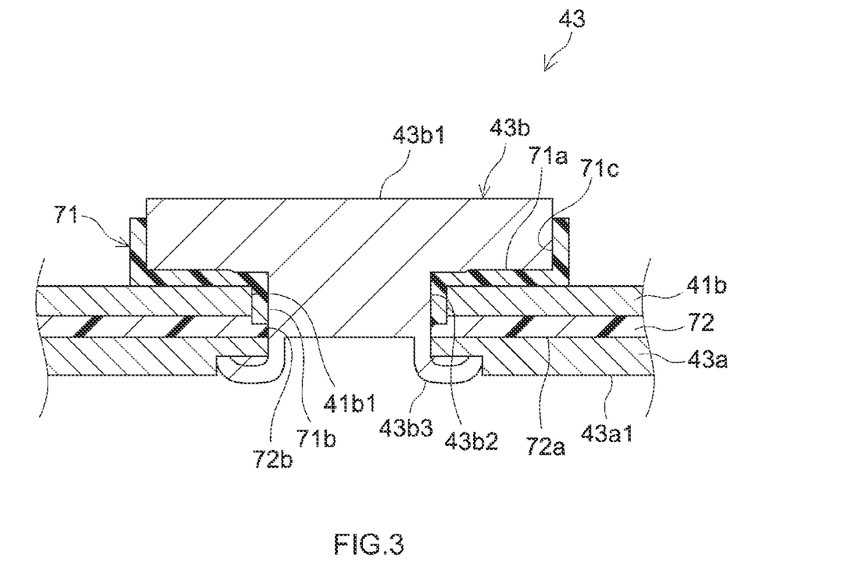
FIG. 3 is a cross-sectional view illustrating a cross section taken along the line III-III of FIG. 2.

FIG. 3 is a cross-sectional view illustrating a cross section taken along the line III-III of FIG. 2. In FIG. 3, a cross section of a portion in which the negative electrode terminal 43 is mounted on the lid 41b is illustrated. In this embodiment, a member obtained by joining dissimilar metals is used for the external terminal 43b of the negative electrode.

In FIG. 3, a cross-sectional shape of the external terminal 43b is schematically illustrated. In FIG. 3, a structure of the dissimilar metals forming the external terminal 43b, an interface of the dissimilar metals, and the like are omitted.

As illustrated in FIG. 3, the lid 41b includes a mounting hole 41b1 used for mounting the external terminal 43b of the negative electrode. The mounting hole 41b1 passes through the lid 41b in a preset position of the lid 41b. The internal terminal 43a and the external terminal 43b of the negative electrode are mounted in the mounting hole 41b1 of the lid 41b with the gasket 71 and the insulator 72 interposed therebetween.

As illustrated in FIG. 3, the external terminal 43b of the negative electrode includes a head portion 43b1, a shaft portion 43b2, and a caulking piece 43b3. The head portion 43b1 is a portion disposed on the outside of the lid 41b. The head portion 43b1 is an approximately flat plate-like portion larger than the mounting hole 41b1. The shaft portion 43b2 is a portion mounted in the mounting hole 41b1 via the gasket 71. The shaft portion 43b2 protrudes downward from an approximately center portion of the head portion 43b1. As illustrated in FIG. 3, the caulking piece 43b3 is a portion caulked to the internal terminal 43a of the negative electrode inside the lid 41b. The caulking piece 43b3 extends from the shaft portion 43b2, is bent after being inserted in the lid 41b, and is caulked to the internal terminal 43a of the negative electrode.

<Gasket 71>

As illustrated in FIG. 3, the gasket 71 is a member mounted in the mounting hole 41b1 of the lid 41b and on an outer surface of the lid 41b. In this embodiment, the gasket 71 includes a seating portion 71a, a boss portion 71b, and a side wall 71c. The seating portion 71a is a portion attached to the outer surface of the lid 41b. The boss portion 71b has an outer shape along an inner surface of the mounting hole 41b1 so as to be attached to the mounting hole 41b1 of the lid 41b. An inner surface of the boss portion 71b is an attaching hole to which the shaft portion 43b2 of the outer terminal 43b is attached. The side wall 71c rises upward from a peripheral edge of the seating portion 71a and extends upward. A head portion 43b1 of the external terminal 43b is attached to a portion surrounded by the side wall 71c of the gasket 71.

The gasket 71 is disposed between the lid 41b and the external terminal 43b to ensure insulation between the lid 41b and the external terminal 43b. The gasket 71 ensures airtightness of the mounting hole 41b1 of the lid 41b. In view of the foregoing, a material excellent in chemical resistance and weather resistance may be used. In this embodiment, PFA is used for the gasket 71. PFA is a tetrafluoroethylene-perfluoroalkylvinylether copolymer. Note that a material used for the gasket 71 is not limited to PFA.

<Insulator 72>

The insulator 72 is a member attached to the inside of the lid 41b around the mounting hole 41b1 of the lid 41b. The insulator 72 includes a bottom wall 72a and a hole 72b. The bottom wall 72a is a portion disposed along the inner surface of the lid 41b. In this embodiment, the bottom wall 72a is an approximately flat plate-like portion. The bottom wall 72a is disposed along the inner surface of the lid 41b. The hole 72b is a hole provided to correspond to the inner surface of the boss portion 71b of the gasket 71. The insulator 72 is provided inside the battery case 41, and therefore, may have a required chemical resistance. In this embodiment, PPS is used for the insulator 72. PPS is poly phenylene sulfide resin. Note that a material used for the insulator 72 is not limited to PPS.

The internal terminal 43a of the negative electrode includes the base portion 43a1 and a connection piece 43a2 (see FIG. 1 and FIG. 2). The base portion 43a1 is a portion attached to the bottom wall 72a of the insulator 72. The connection piece 43a2 extends from one end of the base portion 43a1, further extends in the case body 41a, and is connected to the unformed portion 22a1 of the negative electrode current collecting foil 22a (see FIG. 1 and FIG. 2).

In this embodiment, the boss portion 71b is attached to the mounting hole 41b1 and the gasket 71 is mounted on the outside of the lid 41b. The external terminal 43b is attached to the gasket 71. At this time, the shaft portion 43b2 of the external terminal 43b is inserted through the boss portion 71b of the gasket 71 and the head portion 43b1 of the external terminal 43b is disposed on the seating portion 71a of the gasket 71. The insulator 72 and the negative electrode terminal 43 are mounted on the inside of the lid 41b. As illustrated in FIG. 3, the caulking piece 43b3 of the external terminal 43b is bent and is caulked to the base portion 43a1 of the negative electrode terminal 43. The caulking piece 43b3 of the external terminal 43b and the base portion 43a1 of the negative electrode terminal 43 may be partially joined together by metal joining in order to improve a conductivity.

Incidentally, in the internal terminal 42a of the positive electrode of the lithium-ion secondary battery 10, a required level of oxidation reduction resistance is not as high as that in the negative electrode. In view of the required oxidation reduction resistance and reduction in weight, aluminum can be used for the internal terminal 42a of the positive electrode. In contrast, in the internal terminal 43a of the negative electrode, a required level of oxidation reduction resistance is higher than that in the positive electrode. In view of the foregoing, copper can be used for the internal terminal 43a of the negative electrode. On the other hand, in the bus bar to which the external terminal 43b is connected, in view of reduction in weight and cost cut, aluminum or an aluminum alloy can be used.

Figure 4:
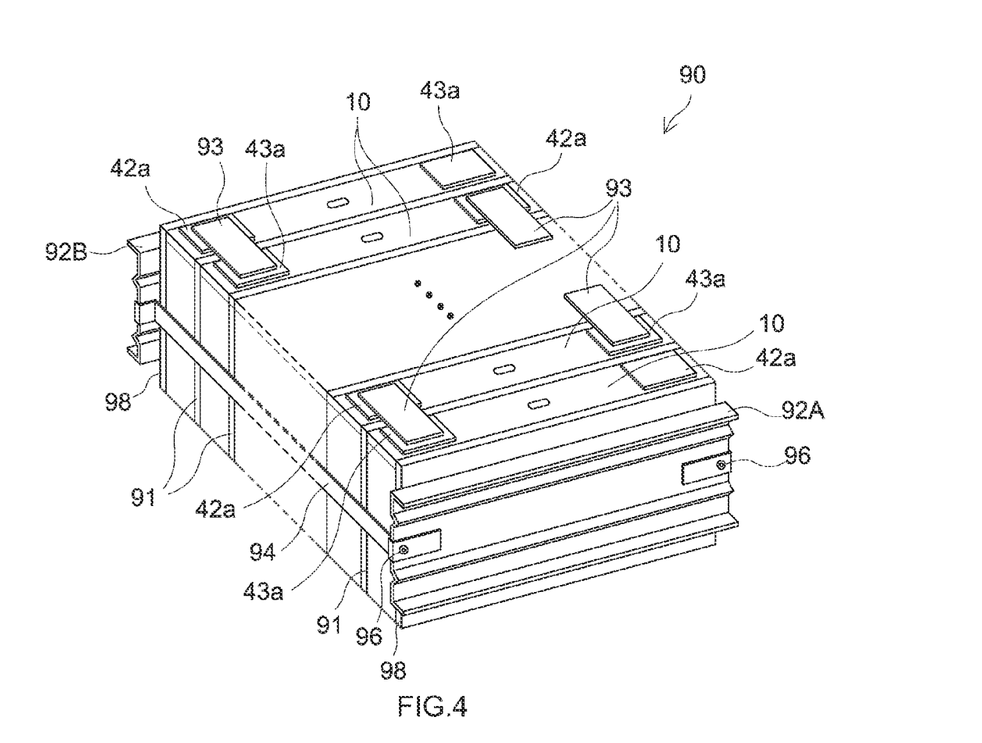
FIG. 4 is a perspective view schematically illustrating a structure of an assembled battery according to one embodiment.

FIG. 4 is a perspective view schematically illustrating an assembled battery 90. The assembled battery 90 includes a lithium-ion secondary battery 10 as a battery cell. The assembled battery 90 includes a plurality of lithium-ion secondary batteries 10 electrically connected mutually and thus arrayed, and further includes a spacer 91 between adjacent ones of the lithium-ion secondary batteries 10. The assembled battery 90 includes a constraining mechanism. For example, as illustrated in FIG. 4, the assembled battery 90 includes a pair of end plates 92A and 92B, a constraining band 94, and a plurality of screws 96. The pair of end plates 92A and 92B are disposed in both ends of the assembled battery 90 in an array direction of the lithium-ion secondary batteries 10. The constraining band 94 is stretched between the pair of end plates 92A and 92B and is mounted on the pair of end plates 92A and 92B via the screws 96. Each of the spacers 91 is sandwiched between corresponding two of the lithium-ion secondary batteries 10 that are adjacent to each other. One end spacer 98 is provided between a corresponding one of the lithium-ion secondary battery 10 and the end plate 92A and the other end spacer 98 is provided between a corresponding one of the lithium-ion secondary battery 10 and the end plate 92B. The positive electrode terminal 42 of one of the lithium-ion secondary batteries 10 forming the assembled battery 90 and the negative electrode terminal 43 of another one of the lithium-ion secondary batteries 10 are electrically connected via a bus bar 93. The bus bar 93 is welded to the positive electrode terminal 42 and the negative electrode terminal 43 by beam welding. Thus, the lithium-ion secondary batteries 10 forming the assembled battery 90 are electrically connected in series in a sequential manner. However, shapes, sizes, the number, disposition, a connection method, or the like of the lithium-ion secondary batteries 10 forming the assembled battery 90 are not limited to embodiments disclosed herein and can be changed as appropriate.

The present inventor has examined employing a terminal component obtained by joining the plurality of metal members by metal joining at least in either one of the positive electrode terminal 42 and the negative electrode terminal 43. By forming the terminal component using a plurality of metal members, for example, the terminal component formed of dissimilar metals can be formed. For such a terminal component, a portion of the terminal component connected to the bus bar 93 can be formed of the same type of metal as that of the bus bar 93 and a portion of the terminal component connected to an internal terminal can be formed of the same type of metal as that of the internal terminal. Thus, the terminal component has preferable electrical connection with the bus bar 93 and the internal terminal, and furthermore, a joining strength can be increased. However, when a metal joining portion of the terminal component and a portion thereof around the metal joining portion are irradiated with a beam by beam welding (for example, laser welding), thermal deterioration of the metal joining portion occurs due to heat input by beam irradiation, so that the joining strength and a conductivity can be reduced. Therefore, a terminal component 200 disclosed herein is created to have a feature that the terminal component 200 includes a raised portion 225 that can shield a periphery of the metal joining portion from irradiation of a beam. The terminal component 200 will be described below.

Figure 5:
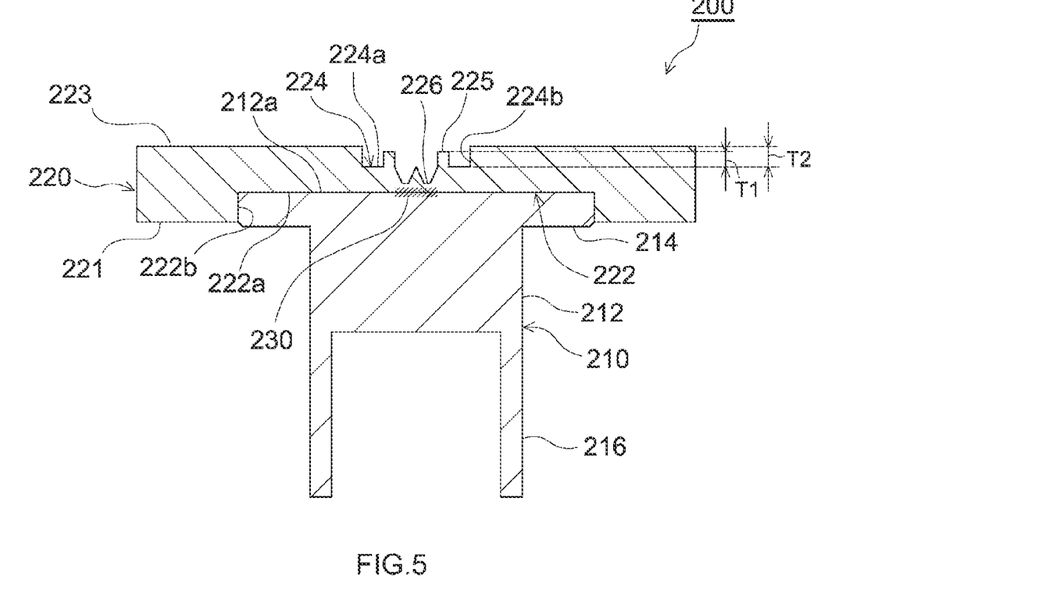
FIG. 5 is a cross-sectional view schematically illustrating a structure of a terminal component according to one embodiment.
Figure 6:
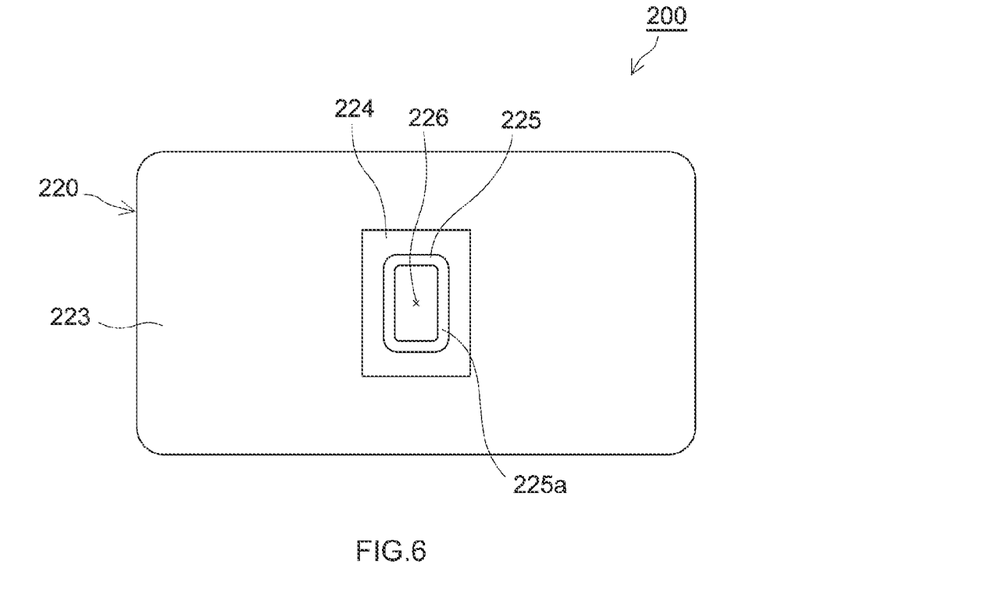
FIG. 6 is a plan view schematically illustrating the structure of the terminal component according to one embodiment.

FIG. 5 is a cross-sectional view schematically illustrating a structure of the terminal component 200. FIG. 6 is a plan view schematically illustrating the structure of the terminal component 200. The terminal component 200 includes a first member 210 and a second member 220 stacked on the first member 210. Each of the first member 210 and the second member 220 is formed of a metal. In this embodiment, the first member 210 is formed of copper and the second member 220 is formed of aluminum.

As illustrated in FIG. 5, in this embodiment, the first member 210 includes a shaft portion 212 and a flange portion 214 extending from one end of the shaft portion 212 in an outer diameter direction. An end portion 212a of the first member 210 in a side in which the flange portion 214 is provided has a circular shape. The flange portion 214 is continuously formed in a circumferential direction of the shaft portion 212. An outer edge of the flange portion 214 is formed so as to be perpendicular to the end portion 212a. In the shaft portion 212, a cylindrical portion 216 that is a portion to be caulked to another member (for example, an internal terminal) is provided in an opposite side to the side in which the flange portion 214 is provided.

In this embodiment, the second member 220 has a plate shape. The second member 220 includes a recessed portion 222 in which the flange portion 214 of the first member 210 is housed on a surface 221 on one surface 221. The recessed portion 222 has a shape corresponding to an outer shape of the flange portion 214. A bottom portion 222a of the recessed portion 222 has a circular shape corresponding to a shape of the end portion 212a of the first member 210. A side peripheral surface 222b of the recessed portion 222 is formed to extend perpendicular from the bottom portion 222a toward an opening. The second member 220 includes a recessed portion 224 on the other surface 223. In this embodiment, the recessed portion 224 is formed from the other surface 223 by notching into a rectangular parallelepiped shape. A side peripheral surface 224b of the recessed portion 224 is formed to extend perpendicular from the bottom portion 224a toward the opening. There is no particular limitation on a shape of the recessed portion 224 and the recessed portion 224 may have a shape, that is, for example, a cubic shape, a hemispherical shape, a columnar shape, a triangular pyramid shape, a rectangular columnar shape, a pyramid shape, a truncated pyramid shape, or the like, in addition to a rectangular parallelepiped shape, obtained by notching.

The first member 210 and the second member 220 have a metal joining portion 230 joined by metal joining in a boundary surface where the first member 210 and the second member 220 are stacked. In this embodiment, an end surface (upper surface) of the first member 210 in a side in which the flange portion 214 is formed and the bottom portion 222a of the recessed portion 222 formed in the surface 221 of the second member 220 are joined by metal joining. In this embodiment, the metal joining portion 230 is formed by ultrasonic joining. Specifically, an ultrasonic joining horn is pressed against the bottom portion 224a of the recessed portion 224 of the second member 220 to give ultrasonic vibration thereto, and thus, the metal joining portion 230 is formed in the boundary surface between the first member 210 and the second member 220. In this embodiment, the bottom portion 224a of the recessed portion 224 includes a contact portion 226 that is a cavity formed by pressing the horn (in FIG. 6, a specific shape is omitted). There is no particular limitation on a method for forming the metal joining portion 230. The metal joining portion 230 may be formed, for example, by resistance welding or the like.

As illustrated in FIG. 5 and FIG. 6, on the surface 223 of the second member 220 in an opposite side to the surface 221 thereof in which the metal joining portion 230 is formed, the raised portion 225 raised from the surface 223 is formed in a peripheral portion close to the metal joining portion 230. With the raised portion 225 formed, in beam-welding the external member (for example, the bus bar 93) to the surface 223 of the second member 220, it is possible to prevent the contact portion 226 from being directly irradiated with a beam. Thus, thermal deterioration of the metal joining portion 230 can be reduced.

As illustrated in FIG. 5, in this embodiment, the raised portion 225 is formed in the bottom portion 224a of the recessed portion 224. A maximum height of a height T1 of the raised portion 225 is designed so as not to exceed a height (depth) T2 of the recessed portion 224. Thus, the external member (for example, the bus bar 93) can be stacked on the surface 223 of the second member 220 so as to seal the recessed portion 224. The height T1 of the raised portion 225 refers to a height from the bottom portion 224a of the recessed portion 224. The height (depth) T2 of the recessed portion 224 refers to a height from the bottom portion 224a of the recessed portion 224 to the surface 223 of the second member 220 including the recessed portion 224. In this embodiment, a height of the side peripheral surface 224b of the recessed portion 224 is the height (depth) T2 of the recessed portion 224.

Although there is no particular limitation, if the height T1 of the raised portion 225 is too low, shielding from beam irradiation can be insufficient. Therefore, an average value of the height T1 of the raised portion 225 may be, for example, 0.1 mm or more, and can be 0.15 mm or more and 0.2 mm or more. On the other hand, if the height T1 of the raised portion 225 is too high, a strength of the raised portion 225 is impaired and the raised portion 225 easily falls off from the second member 220. Therefore, the average value of the height T1 of the raised portion 225 may be, for example, 0.5 mm or less, and may be 0.45 mm or less and 0.4 mm or less. The average value of the height T1 of the raised portion 225 can be, for example, an average value obtained when a height of the raised portion 225 is measured in 20 or more positions at random.

Figure 7:
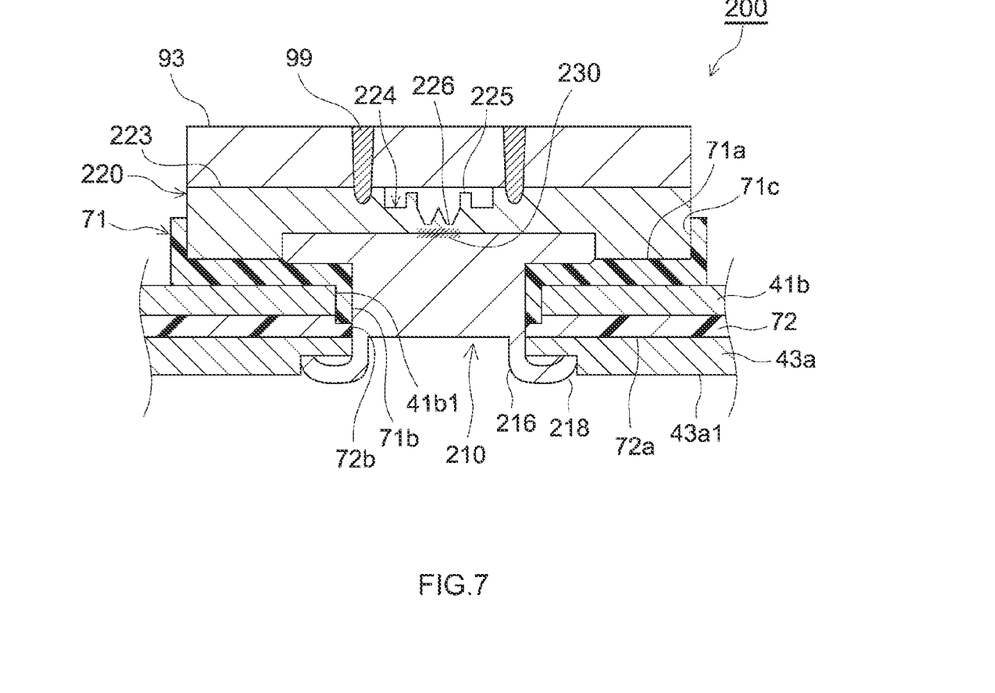
FIG. 7 is a schematic view illustrating a structure when a terminal component disclosed herein is employed as an external terminal of a negative electrode terminal of a battery cell in an assembled battery according to one embodiment.

FIG. 7 is a schematic view illustrating a structure when the terminal component 200 is employed as the external terminal 43b of the negative electrode terminal 43 of the battery cell in the assembled battery 90. On the surface 223 of the second member 220, the bus bar 93 is beam welded. In this embodiment, welding portions 99 obtained by performing beam welding on the bus bar 93 are formed in two positions. In this embodiment, the bus bar 93 is formed of aluminum. As illustrated in FIG. 7, the raised portion 225 is located between the metal joining portion 230 and each of the welding portions 99.

As the assembled battery 90 or the lithium-ion secondary battery 10 has been used for a long period of time, a portion of the raised portion 225 can fall off from the surface. Therefore, the welding portion 99 is preferably formed near the recessed portion 224 such that the portion that has fallen off is not discharged from the recessed portion 224. Thus, the recessed portion 224 can be reliably sealed. At this time, there is a probability that, as the welding portion 99 is located closer to the recessed portion 224, the inside of the recessed portion 224 is more easily irradiated with a beam. However, beam irradiation to the contact portion 226 can be reduced by the raised portion 225 and heat input to the metal joining portion 230 can be reduced. There is no particular limitation on a type of beam welding and examples of the beam welding include, for example, laser welding, electron beam welding, or the like.

As illustrated in FIG. 6, in this embodiment, the raised portion 225 is continuously formed so as to surround the contact portion 226. In other words, the raised portion 225 is formed so as to surround the metal joining portion 230. Thus, regardless of a position in which the external member is beam welded, beam irradiation to the contact portion 226 can be preferably reduced and heat input of the metal joining portion 230 can be reduced. The raised portion 225 may be formed at least in a portion near the contact portion 226 in a predetermined direction in which beam welding is performed. Therefore, the raised portion 225 may be discontinuously formed.

As illustrated in FIG. 5 and FIG. 6, the raised portion 225 can have a flat upper surface 225a. Since the raised portion 225 has the upper surface 225a, the raised portion 225 has an increased thickness (width), so that beam irradiation to the contact portion 226 can be preferably suppressed. Moreover, according to a structure described above, the strength of the raised portion 225 is increased, so that the raised portion 225 is less likely to fall off.

As illustrated in FIG. 6, in this embodiment, the raised portion 225 can be formed into a rectangular shape with corners rounded into an R shape when viewed from top. However, there is no particular limitation on a shape of the raised portion 225 when viewed from top. The shape of the raised portion 225 may be, for example, a rectangular shape, a square shape, a ring shape, or the like, and any one of these shapes may be intermittently formed.

One embodiment of the terminal component 200 has been described above. However, the embodiment described above is merely an example and can be implemented in various other embodiments. For example, although, in the embodiment described above, in the terminal component 200, the first member 210 is formed of copper, the second member 220 is formed of aluminum, and the bus bar 93 is formed of aluminum, there is no particular limitation thereto. Each of the first member 210, the second member 220, and the bus bar may be formed of, for example, copper, an alloy containing copper as a main body, aluminum, an alloy containing aluminum as a main body, nickel, or the like. The first member 210 and the second member 220 may be formed of different metals from each other, and may be formed of the same type of metal. Moreover, the terminal component 200 can be employed also as the external terminal 42b of the positive electrode current collector 42.

As used herein, the "alloy containing aluminum as a main body" refers to an alloy at least 50% or more of which is aluminum. There is no particular limitation on other elements that can be contained in the aluminum material but, for example, silicon, iron, copper, manganese, magnesium, zinc, chromium, titanium, lead, zirconium, or the like can be contained in the aluminum material. Moreover, the "alloy containing copper as a main body" refers to an alloy at least 50% or more of which is copper. There is no particular limitation on other elements that can be contained in the copper material but, for example, silicon, iron, manganese, magnesium, zinc, chromium, titanium, lead, tin, phosphorus, aluminum, nickel, cobalt, beryllium, zirconium, or the like can be contained in the copper material.

One example of a method for producing the terminal component 200 will be described below. Ultrasonic joining using an ultrasonic joining horn 100 that will be described later is given as an example. In this method, when the metal joining portion 230 between the first member 210 and the second member 220 is formed, the raised portion 225 can be also formed at the same time. Thus, it is not needed to add steps of forming the raised portion 225, and therefore, a time and costs can be reduced. A structure of the horn 100 and ultrasonic joining using the horn 100 will be described below.

Figure 8:
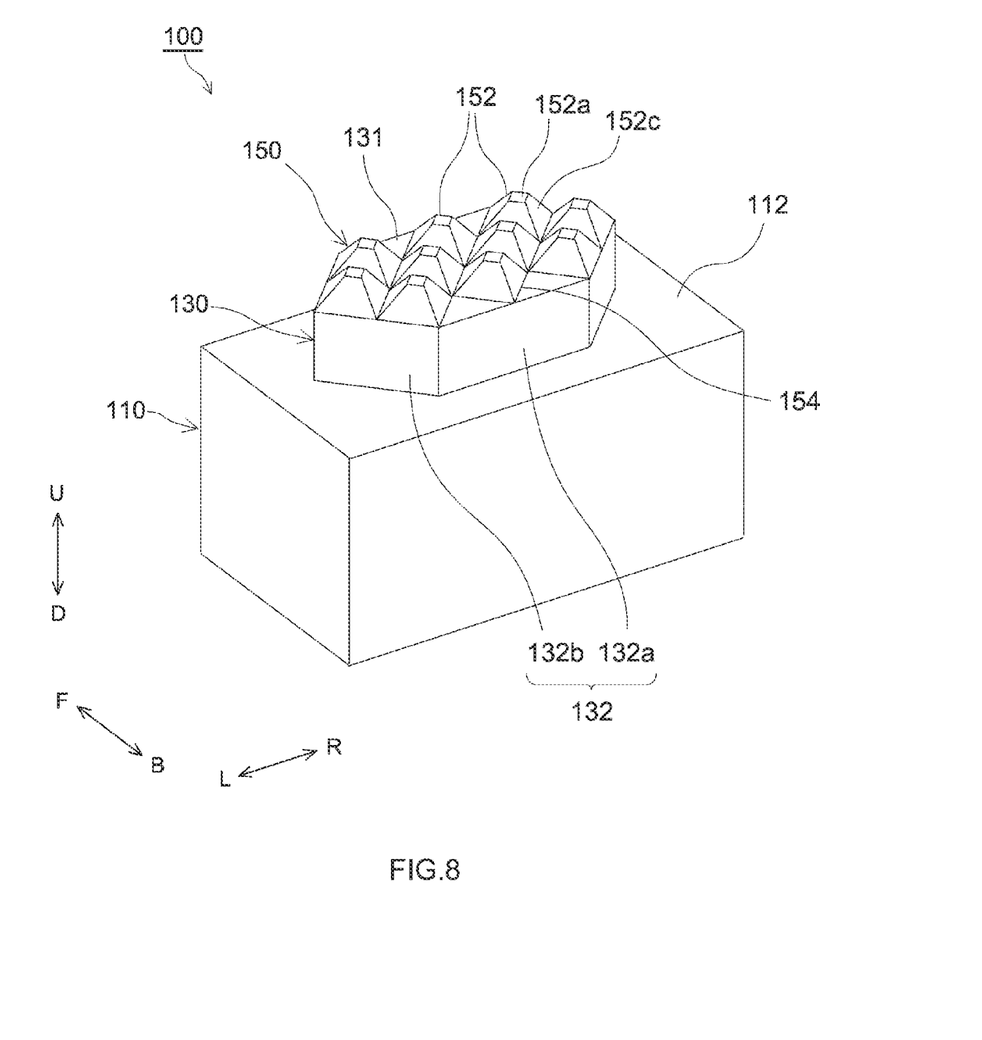
FIG. 8 is a perspective view schematically illustrating a structure of a horn.
Figure 9:
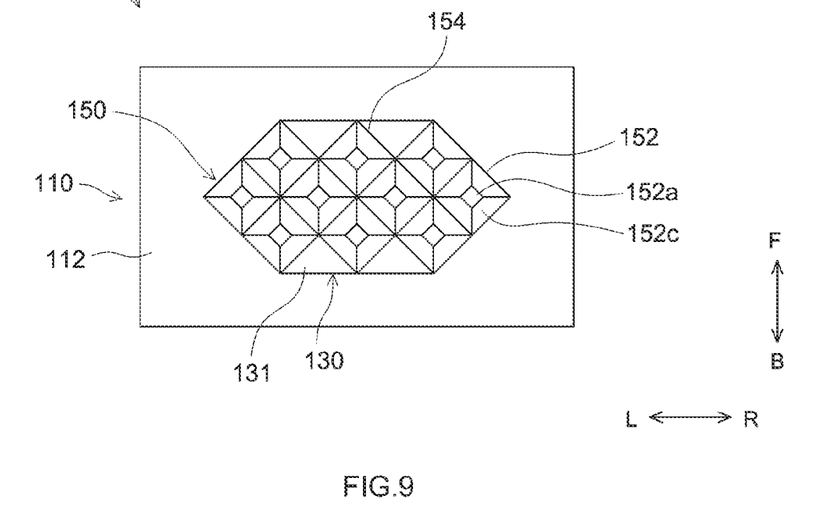
FIG. 9 is a plan view schematically illustrating the structure of the horn.
Figure 10:
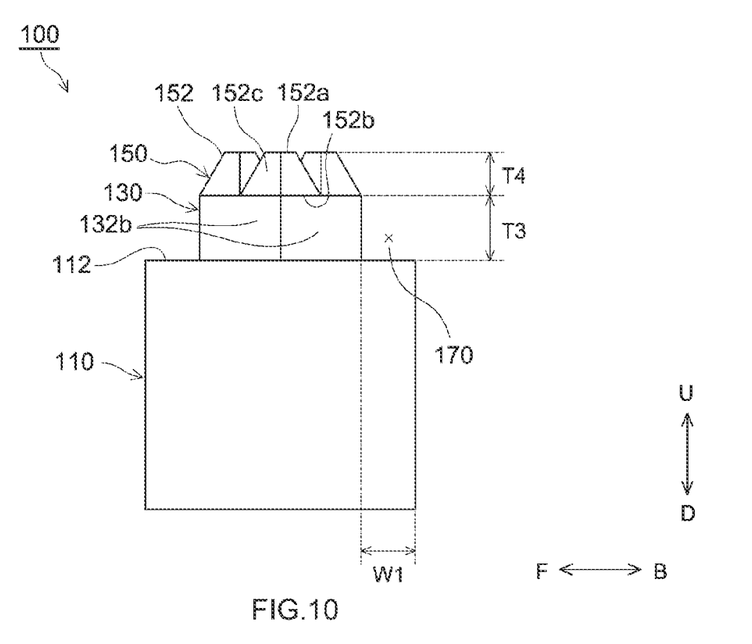
FIG. 10 is a side view schematically illustrating the structure of the horn.

One embodiment of the horn 100 will be described in FIG. 8 to FIG. 10. FIG. 8 is a perspective view schematically illustrating the structure of the horn 100. FIG. 9 is a plan view schematically illustrating the structure of the horn 100. FIG. 10 is a side view schematically illustrating the structure of the horn 100. In the following description, reference signs F, B, L, R, U, and D in the drawings indicate front, rear, left, right, up, and down, respectively. However, these directions are used herein merely for convenience of description, and do not limit setting modes of the horn 100.

As illustrated in FIG. 8, the horn 100 includes a base portion 110, a stand portion 130, and a pressure contact portion 150. The horn 100 is mounted on an ultrasonic oscillator (not illustrated), and thus, can generate ultrasonic vibration in a predetermined direction. Thus, the horn 100 can transmit ultrasonic vibration to workpieces to be joined, so that ultrasonic joining can be realized. In the following description, it is assumed that a direction of ultrasonic vibration (which will be also hereinafter simply referred to as a "vibration direction") is a front-rear direction.

The base portion 110 is a portion connected to the ultrasonic oscillator. As illustrated in FIG. 9, herein, the base portion 110 has a rectangular surface when viewed from top. The stand portion 130 is formed so as to rise from the surface (upper surface) of the base portion 110. When viewed from top, the upper surface of the base portion 110 has a larger area than that of the stand portion 130 and has an exposed surface 112 on which the stand portion 130 is not formed. In this embodiment, the base portion 110 is formed in a rectangular parallelopiped shape but there is no particular limitation on an entire shape of the base portion 110 if the base portion 110 has an upper surface from which the stand portion 130 rises. There is also no particular limitation on a shape of a surface of the base portion 110 from which the stand portion 130 rises when viewed from top. The shape of the upper surface of the base portion 110 may be, for example, a polygonal shape, a circular shape, an elliptical shape, or the like. The base portion 110 may be formed of a material conventionally used for a horn and, for example, a super hard alloy, die steel, high speed steel, or the like can be used.

The stand portion 130 is a portion that rises from the surface of the base portion 110 and exists between the base portion 110 and the pressure contact portion 150. As illustrated in FIG. 9, when viewed from top, the stand portion 130 is formed in a smaller area range than that of the surface of the base portion 110. In this embodiment, when viewed from top, an upper surface 131 of the stand portion 130 has a larger area than that of the pressure contact portion 150. Herein, the upper surface 131 of the stand portion 130 is in parallel to the upper surface of the base portion 110.

As illustrated in FIG. 9, in this embodiment, an outer shape of the stand portion 130 is a hexagonal shape having long sides extending in a left-right direction when viewed from top. A peripheral wall 132 is formed between the upper surface 131 of the stand portion 130 and the upper surface of the base portion 110. The peripheral wall 132 includes a pair of broad width surfaces 132a that extend so as to be opposed to each other in the vibration direction and four narrow width surfaces 132b.

There is no particular limitation on the outer shape of the stand portion 130. The outer shape of the stand portion 130 can be a polygonal shape, a circular shape, an elliptical shape, or the like when viewed from top. The stand portion 130 can be formed of the same material as that of the base portion 110. Coat treatment of forming a diamond like carbon (DLC) coat, a titanium nitride (TiN) coat, or the like, may be performed on a portion of the stand portion 130 (for example, the upper surface 131 of the stand portion 130) that contacts with one of the workpieces to be joined. Thus, adhesion of a metal (for example, aluminum) forming the workpiece to be joined can be reduced. Moreover, wear resistance can be increased by coat treatment.

The pressure contact portion 150 is formed of a plurality of protrusions 152 that protrude from the upper surface 131 of the stand portion 130. The protrusions 152 are arrayed on the upper surface 131 of the stand portion 130. The pressure contact portion 150 is a portion that is pressed against the workpieces to be joined and transmits ultrasonic vibration to the workpieces to be joined.

As illustrated in FIG. 8 and FIG. 9, in this embodiment, the pressure contact portion 150 includes ten protrusions 152. The number of the protrusions 152 may be two or more and, for example, may be five or more, eight or more, ten or more, and twelve or more. The number of the protrusions 152 can be changed as appropriate in accordance with an area of a portion in which the workpieces to be joined are joined by ultrasonic joining or the like, and an upper limit is not particularly set. For example, the number of the protrusions 152 may be 100 or less, 50 or less, and 20 or less. The protrusions 152 may be formed of the same material as that of the base portion 110. Similar to the stand portion 130, the coat treatment described above may be performed on the protrusions 152.

As illustrated in FIG. 8 to FIG. 10, in this embodiment, each of the protrusions 152 is formed in a truncated quadrangular pyramid shape. Herein, the protrusion 152 includes a square upper surface 152a, a square bottom surface 152b, and four side surfaces 152c formed between the upper surface 152a and the bottom surface 152b. The upper surface 152a has a smaller area than that of the bottom surface 152b. A shape of the protrusion 152 is not limited thereto and can be, for example, a pyramid shape, such as a trigonal pyramid shape, a quadrangular pyramid shape, a hexagonal pyramid shape, or the like, or a truncated pyramid shape, such as a truncated trigonal pyramid shape, a truncated hexagonal pyramid shape, or the like. The shapes of the protrusions 152 may not necessarily be all the same.

As illustrated in FIG. 9, when viewed from top, a zigzag portion 154 formed in a zigzag shape is formed in at least a portion of a peripheral edge of a portion in which the protrusions 152 are arrayed. In this embodiment, the zigzag portion 154 is formed by the bottom surfaces 152b of the three protrusions 152 disposed along a perpendicular direction to the vibration direction. As illustrated in FIG. 8 and FIG. 9, the zigzag portion 154 typically has a zigzag shape with apexes connected to each other by straight lines. However, the zigzag portion 154 may have a shape with apex portions that have been R-processed.

The zigzag portion 154 is formed by arranging at least two protrusions 152 in an array or arrays, but there is no particular limitation on the number of the protrusions 152 forming the zigzag portion 154. For example, the number of the protrusions 152 forming the zigzag portion 154 may be, for example, three or more, four or more, and five or more. The number of the protrusions 152 forming the zigzag portion 154 is limited by an area of the upper surface 131 of the stand portion 130. Although there is no particular limitation, the number of the protrusions 152 forming the zigzag portion 154 can be, for example, 20 or less, 15 or less, and ten or less.

Figure 11A:
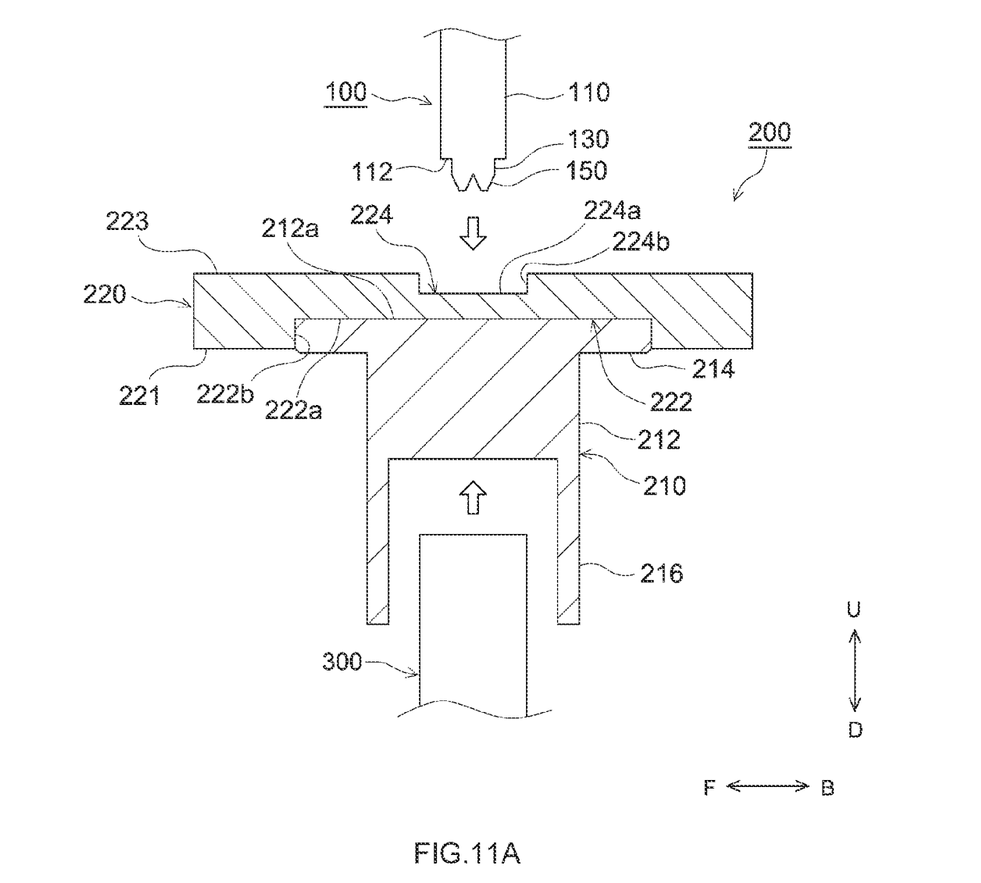
FIG. 11A is a schematic view illustrating a structure of a terminal component before being ultrasonically joined.
Figure 11B:
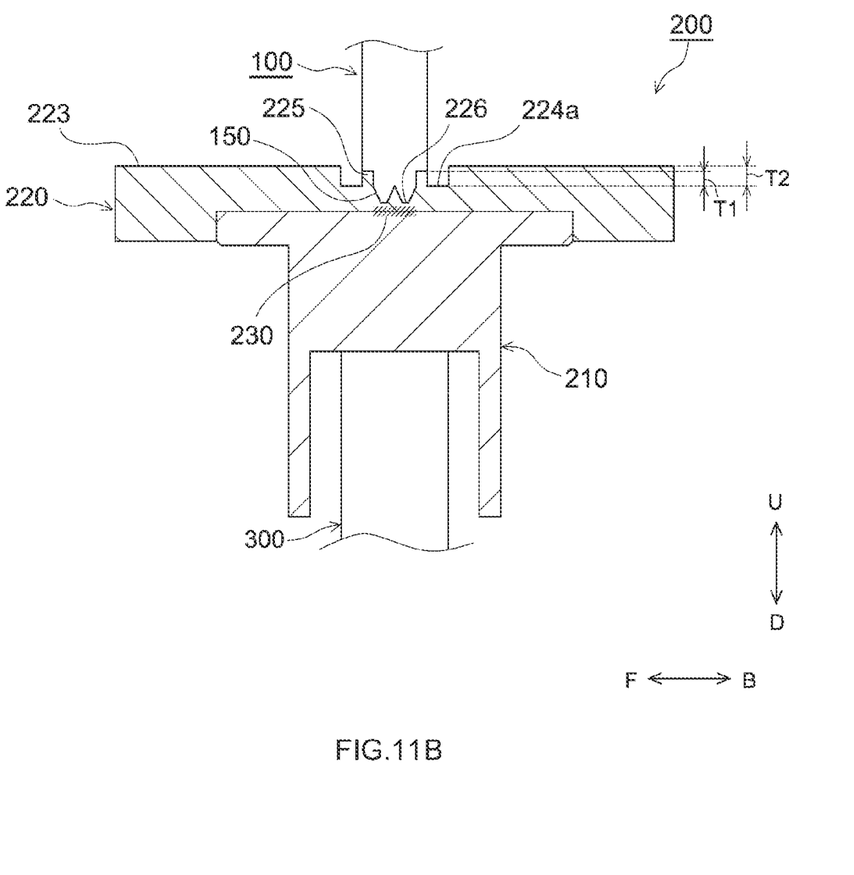
FIG. 11B is a schematic view schematically illustrating steps of ultrasonic joining.

FIG. 11A and FIG. 11B are schematic views roughly illustrated processes of joining the first member 210 and second member 220 of the terminal component 200 by ultrasonic joining. FIG. 11A is a schematic view illustrating a structure of the terminal component 200 before being ultrasonically joined. FIG. 11B is a schematic view schematically illustrating steps of ultrasonic joining.

As illustrated in FIG. 11A and FIG. 11B, ultrasonic joining is performed in a state where the first member 210 and the second member 220 including the recessed portion 224 are stacked. The horn 100 is mounted on the ultrasonic oscillator (not illustrated). The pressure contact portion 150 of the horn 100 is pressed against the bottom portion 224a of the recessed portion 224 of the second member 220. On the other hand, the anvil 300 is pressed from a side of the first member 210 in which the cylindrical portion 216 is provided. Thus, the first member 210 and the second member 220 are sandwiched between the horn 100 and the anvil 300. Then, the first member 210 and the second member 220 are joined to each other by transmitting ultrasonic vibration (in FIG. 11A and FIG. 11B, a front-rear direction is a vibration direction) generated by the ultrasonic oscillator to the horn 100 and giving the ultrasonic vibration while pressuring the second member 220 by the horn 100, and thus, the metal joining portion 230 is formed.

As illustrated in FIG. 11B, the raised portion 225 formed due to accumulation of the burrs generated by ultrasonic joining is formed. The horn 100 includes the stand portion 130 and the exposed surface 112 of the base portion 110, and therefore, when the burrs generated around the contact portion 226 grow in a height direction, the burrs are pressed in by the exposed surface 112, and therefore, the height of the raised portion 225 is suppressed. Thus, the height T1 of the raised portion 225 can be adjusted so as not to exceed the height (depth) T2 of the recessed portion 224.

The horn 100 has the zigzag portion 154 in the peripheral edge of the portion in which the protrusions 152 are arrayed, and therefore, the burrs generated during ultrasonic joining are guided to valley portions of the zigzag portion 154. Thus, it is possible to suppress the generated burrs from being formed and spreading in the horizontal direction, and therefore, the burrs easily grow in the height direction. The burrs that have grown in the height direction are easily suppressed by the exposed surface 112. As a result, the raised portion 225 can be formed to have a desired height or less.

Various conditions of ultrasonic joining are set as appropriate in accordance with metal types of workpieces to be joined (herein, the first member 210 and the second member 202), dimensions, a shape of the horn 100, or the like, and therefore, there is no particular limitation on conditions of ultrasonic joining. For example, in a case where the first member 210 is copper and the second member 220 is aluminum, ultrasonic joining can be performed under conditions under which an amplitude is about 20 μm to 50 μm, a frequency is about 19 kHz to 21 kHz, a load with which the horn 100 is pressed against the workpieces to be joined is 30 N to 200 N, and an energy amount given to the workpieces to be joined is about 30 J to 200 J.

In the manner described above, the terminal component 200 including the raised portion 225 can be produced. A structure of the horn 100 with which the raised portion 225 can be more preferably formed will be described below.

The zigzag portion 154 of the horn 100 is preferably formed along at least one of the vibration direction (herein, the front-rear direction) and the perpendicular direction to the vibration direction (herein, the left-right direction) and, in particular, the zigzag portion 154 is more preferably formed along the perpendicular direction to the vibration direction. The burrs are easily generated toward the vibration direction, and therefore, with the zigzag portion 154 formed along the perpendicular direction to the vibration direction, the raised portion 225 in a side of the contact portion 226 in the vibration direction can be more stably formed.

Moreover, when viewed from top, the peripheral edge of the portion in which the protrusions 152 are arrayed preferably does not have any one of a side extending in the vibration direction and a side extending in the perpendicular direction to the vibration direction. According to a structure described above, in the vibration direction and the perpendicular direction to the vibration direction, sides (angles) connecting the upper surface 152a and the bottom surface 152b of each of the protrusions 152 contact the one of the workpieces to be joined before the side surfaces 152c of the protrusion 152 contact the workpiece to be joined. Thus, pushing out the burrs straightly in the vibration direction is suppressed, so that the burrs can be preferably controlled and the raised portion 225 having a more stable shape can be formed.

The burrs generated during ultrasonic joining are accumulated in the burr accumulation portion 170, thereby forming the raised portion 225. That is, the shape of the raised portion 225 can be roughly controlled by the shape of the burr accumulation portion 170. For example, the height T1 of the raised portion 225 can be controlled to be equal to or less than a height T3 of the stand portion. Moreover, the upper surface 225a of the raised portion 225 is formed by contact of the raised portion 225 with the exposed surface 112, and therefore, when the exposed surface 112 is flat, the upper surface 225a of the raised portion 225 can be formed to be flat.

The burr accumulation portion 170 is, roughly speaking, a space up to the height T3 of the stand portion 130 of a space above the exposed surface 112 (see FIG. 10). The height T3 of the stand portion 130 is a height from the upper surface (the exposed surface 112) of the base portion 110.

A volume of the burr accumulation portion 170 is preferably larger than an overall volume of the protrusions 152 (the pressure contact portion 150). It is estimated that a volume of the burrs generated by ultrasonic joining corresponds to a volume of a portion of the horn 100 that digs in the one of the workpieces to be joined. That is, it is estimated that the burrs corresponding to the overall volume of the protrusions 152 can be generated. Therefore, the volume of the burr accumulation portion 170 is larger than the volume of the overall volume of the protrusions 152, so that the height of the burrs can be more reliably controlled. The volume of the burr accumulation portion 170 can be roughly calculated in accordance with (the area of the exposed surface 112)×(the height T3 of the stand portion 130). However, how to calculate the volume can be changed as appropriate depending on a shape of the exposed surface 112, a shape of the stand portion 130, or the like.

A ratio between the height T3 of the stand portion 130 and a height T4 of the protrusions 152 (the pressure contact portion 150) can be, for example, 5:1 to 1:1, is preferably 4:1 to 1:1, is more preferably 3:1 to 1:1, and can be, for example, 2:1 to 1:1. If the height T3 of the stand portion 130 is too large with respect to the height T4 of the protrusions 152, a rigidity is reduced, and a durability of the stand portion 130 can be reduced. If the height T3 of the stand portion 130 is too small with respect to the height T4 of the protrusions 152, not preferably, the burrs that suppressed by the exposed surface 112 grow in the horizontal direction and spread in a disorderly manner. The height T4 of the protrusions 152 is a height from the upper surface 131 of the stand portion 130 (the bottom surface 152b of the protrusion 152) to the upper surface 152a of the protrusion 152 (the apex in a case where the protrusion 152 is a pyramid).

There is no particular limitation on the height T3 of the stand portion 130, but the height T3 of the stand portion 130 may be, for example, 0.1 mm or more, and can be 0.3 mm or more. Moreover, the height T3 of the stand portion 130 may be, for example, 1.5 mm or less, and can be 1 mm or less and 0.5 mm or less.

If the height T4 of the protrusions 152 is too small, a contact area of the protrusions 152 and the one of the workpieces to be joined is increased, and a constituent (for example, aluminum) of the workpiece to be joined easily adheres to the protrusions 152. Therefore, the height T4 of the protrusions 152 may be, for example, 0.03 mm or more, and can be 0.1 mm or more and 0.2 mm or more. If the height T4 of the protrusions 152 is too large, a rigidity of the protrusions 152 is reduced, and therefore, a durability of the protrusions 152 is reduced. Therefore, the height T4 of the protrusions 152 may be, for example, 0.3 mm or less, and can be 0.25 mm or less. The height T4 of the protrusions 152 can be changed as appropriate depending on conditions of ultrasonic joining, such as a material and a thickness of each of the workpieces to be joined, and therefore, is not limited to the numerical ranges described above.

As illustrated in FIG. 8 and FIG. 9, the protrusions 152 are preferably disposed so as to adjoin to each other without a flat groove between every adjacent ones of the protrusions. In other words, the bottom surfaces 152b of the protrusions 152 adjoin to each other without any space between adjacent ones of the bottom surfaces 152b. Thus, an amount of the burrs entering between the protrusions 152 can be reduced and the burrs can be made to be easily accumulated around the contact portion 226, so that the raised portion 225 is preferably formed. Disposition of the protrusions 152 is not limited thereto and, for example, the protrusions 152 may be disposed with a gap (groove) between adjacent ones of the protrusions 152.

As illustrated in FIG. 9, in this embodiment, when viewed from top, the exposed surface 112 of the base portion 110 is provided in an entire periphery of the stand portion 130. In other words, the stand portion 130 is formed more inward than an end portion of the surface of the base portion 110. Thus, in any direction around the ultrasonic joining portion, the height T1 of the raised portion 225 can be preferably controlled.

As illustrated in FIG. 10, a width W1 of the exposed surface 112 may be, for example, ⅓ times or more the height T4 of the protrusions 152, and may be ½ time or more, one time or more, twice or more, or four times or more the height T4 of the protrusions 152. Thus, the burrs can be more reliably accumulated in the burr accumulation portion 170 and the height of the burrs can be preferably controlled. Herein, the width W1 of the exposed surface 112 is a distance from the peripheral wall 132 of the stand portion 130 to the outer shape of the exposed surface when the peripheral wall 132 and the outer shape are perpendicularly connected, and the width W1 can vary for each surface of the peripheral wall 132 (herein, the broad width surfaces 132a and the narrow width surfaces 132b). The width W1 of the exposed surface 112 is not limited to the ratio described above, and can be changed as appropriate depending on the height T1 of the stand portion 130. In other words, the width W1 of the exposed surface 112 may be designed such that the volume of the burr accumulation portion 170 is larger than the overall volume of the protrusions 152 (the pressure contact portion 150).

Moreover, the width of the exposed surface 112 may not be equal through the entire periphery of the stand portion 130. For example, as for burrs, many burrs are generated in the vibration direction, and therefore, the width of the exposed surface 112 in the vibration direction is preferably larger than the width of the exposed surface 112 in the perpendicular direction to the vibration direction (in FIG. 11A and FIG. 11B, a left-right direction).

A method for producing the terminal component 200 by ultrasonic joining using the horn 100 has been described above. However, a method forming the raised portion 225 is not limited thereto. For example, the raised portion 225 can be formed by press molding.

Specific examples of the technology disclosed herein have been described in detail above, but these are merely examples and do not limit the scope of the claims. The technology disclosed herein includes various modifications and changes of the specific examples described above.

What is claimed is:

1. A terminal component comprising:
a metal first member;
a metal, plate-like second member;
a metal joining portion at an intersection of the first and second members along a boundary surface where the first member and the second member are stacked in contact with each other; and
a raised portion protruding from an opposite surface of the second member on an opposite side of the second member from the boundary surface, the raised portion including a flat upper surface, wherein
the opposite surface of the second member on the opposite side of the second member from the boundary surface includes an uppermost surface portion that is a portion of the opposite surface of the second member at the greatest distance from the boundary surface in a direction perpendicular to the boundary surface, and a recessed portion defined into the uppermost surface portion to extend toward the metal joining portion,
the raised portion protrudes toward the uppermost surface portion from a bottom portion of the recessed portion,
the opposite surface of the second member further includes a cavity portion extending deeper into the second member from the uppermost surface portion than the recessed portion toward the metal joining portion,
the cavity portion includes a zigzag portion protruding from a bottom surface of the cavity portion in a zigzag shape, and
the raised portion is continuously formed to surround the metal joining portion and the zigzag portion.

2. The terminal component according to claim 1, wherein a maximum height of the raised portion from the bottom portion of the recessed portion does not exceed a maximum height from the bottom portion of the recessed portion to the uppermost surface portion of the opposite surface of the second member.

3. The terminal component according to claim 1, wherein the metal joining portion is an ultrasonically joined portion.

4. The terminal component according to claim 1, wherein the zigzag portion protrudes from the bottom of the cavity portion at a center of the cavity portion.

5. A secondary battery comprising:
an electrode body including a positive electrode and a negative electrode;
a battery case housing the electrode body therein;
a positive electrode terminal electrically connected to the positive electrode;
a negative electrode terminal electrically connected to the negative electrode, wherein
at least one of the positive electrode terminal and the negative electrode terminal includes the terminal component according to claim 1.

6. An assembled battery including a plurality of battery cells electrically connected mutually and thus arrayed, the assembled battery comprising:
the secondary battery according to claim 5 as at least one of the battery cells.

7. The assembled battery according to claim 6, wherein for the plurality of battery cells, the positive electrode of one of the plurality of battery cells and the negative electrode of another one of the plurality of battery cells are electrically connected to each other via a bus bar,
the terminal component includes a welding portion in which the second member and the bus bar electrically connected to the second member are beam welded, and
the raised portion is located between the metal joining portion and the welding portion.

* * * * *